(12) United States Patent
Matthews et al.

(10) Patent No.: US 10,671,367 B2
(45) Date of Patent: *Jun. 2, 2020

(54) SYSTEM AND METHOD FOR ANALYZING USER EXPERIENCE OF A SOFTWARE APPLICATION ACROSS DISPARATE DEVICES

(71) Applicant: APKUDO, LLC, Baltimore, MD (US)

(72) Inventors: Joshua Scott Matthews, Baltimore, MD (US); David Michael Teitelbaum, Havre de Grace, MD (US)

(73) Assignee: Apkudo, LLC, Baltimore, MD (US)

( * ) Notice: Subject to any disclaimer, the term of this patent is extended or adjusted under 35 U.S.C. 154(b) by 446 days.

This patent is subject to a terminal disclaimer.

(21) Appl. No.: 15/393,244

(22) Filed: Dec. 28, 2016

(65) Prior Publication Data
US 2017/0109154 A1    Apr. 20, 2017

Related U.S. Application Data

(63) Continuation of application No. 13/692,161, filed on Dec. 3, 2012, now Pat. No. 9,578,133.

(51) Int. Cl.
*G06F 8/65* (2018.01)
*G06F 8/38* (2018.01)
(Continued)

(52) U.S. Cl.
CPC .............. *G06F 8/65* (2013.01); *G06F 8/38* (2013.01); *G06F 9/328* (2013.01); *H04L 67/10* (2013.01);
(Continued)

(58) Field of Classification Search
CPC ............................. H04W 88/02; G06F 17/30
See application file for complete search history.

(56) References Cited

U.S. PATENT DOCUMENTS 6,044,398 A    3/2000  Marullo et al.
6,105,042 A *  8/2000  Aganovic ............... G06F 3/14
                                                    345/660
(Continued)

FOREIGN PATENT DOCUMENTS

CN    102110053 A    6/2011
CN    102141960 A    8/2011
(Continued)

OTHER PUBLICATIONS

"Monkeyrunner", A Simple monkeyrunner Program, The monkeyrunner API, Running monkeyrunner, monkeyrunner Built-in Help, and Extending monkeyrunner with Plugins, [no date], 6 pages.
(Continued)

*Primary Examiner* — Barbara B Anyan
(74) *Attorney, Agent, or Firm* — Pillsbury Winthrop Shaw Pittman LLP

(57) ABSTRACT

A system for providing a consistent user experience of an application across disparate mobile devices comprises a computing device including a display analysis application, and one or more mobile devices including a display analysis application is provided. In one example, a mobile device comprises a memory storing a version of an operating system, a display analysis patch, and a patched application. A consistency module of the mobile device is configured to access the application with the display analysis patch, obtain one or more display parameters of the mobile device via the application with the display analysis patch, and transmit the obtained one or more display parameters to a computing device.

20 Claims, 7 Drawing Sheets

(51) Int. Cl.
  *H04W 4/50* (2018.01)
  *H04L 29/08* (2006.01)
  *G06F 9/32* (2018.01)
  *H04W 24/06* (2009.01)
  *G06Q 30/02* (2012.01)

(52) U.S. Cl.
  CPC ............... *H04L 67/34* (2013.01); *H04W 4/50* (2018.02); *G06Q 30/02* (2013.01); *G06Q 30/0251* (2013.01); *H04W 24/06* (2013.01)

(56) References Cited

U.S. PATENT DOCUMENTS

| | | |
|---|---|---|
| 6,618,045 B1 | 9/2003 | Lin |
| 6,745,385 B1 | 6/2004 | Lupu et al. |
| 7,343,390 B2 | 3/2008 | Cohen et al. |
| 7,388,977 B2 | 6/2008 | Wang et al. |
| 7,483,984 B1 | 1/2009 | Jonker et al. |
| 7,769,009 B1 | 8/2010 | Katzer et al. |
| 8,271,608 B2 | 9/2012 | Mahaffey et al. |
| 8,275,843 B2 | 9/2012 | Anantharaman et al. |
| 8,296,445 B1 | 10/2012 | Hackborn et al. |
| 8,832,127 B1 | 9/2014 | Pedregal et al. |
| 8,971,821 B2 | 3/2015 | Schlub et al. |
| 2003/0145317 A1 | 7/2003 | Chamberlain |
| 2004/0261248 A1 | 12/2004 | Hwang |
| 2006/0038581 A1 | 2/2006 | Kanai |
| 2006/0139269 A1 | 6/2006 | Takeshita et al. |
| 2006/0174162 A1 | 8/2006 | Varadarajan et al. |
| 2006/0242124 A1 | 10/2006 | Fields |
| 2007/0083813 A1 | 4/2007 | Lui et al. |
| 2007/0100653 A1 | 5/2007 | Ramer et al. |
| 2007/0186250 A1 | 8/2007 | Carey |
| 2007/0205751 A1 | 9/2007 | Suzuki et al. |
| 2007/0256114 A1 | 11/2007 | Johnson et al. |
| 2008/0013825 A1 | 1/2008 | Nagatsuka et al. |
| 2008/0091686 A1 | 4/2008 | Beard |
| 2008/0274716 A1 | 11/2008 | Fok et al. |
| 2008/0316217 A1 | 12/2008 | Khan |
| 2008/0316368 A1 | 12/2008 | Fritsch et al. |
| 2009/0007074 A1 | 1/2009 | Campion et al. |
| 2009/0031015 A1 | 1/2009 | Morgan et al. |
| 2009/0124250 A1 | 5/2009 | Topaltzas et al. |
| 2009/0138579 A1 | 5/2009 | Jung |
| 2009/0203368 A1 | 8/2009 | Marsyla et al. |
| 2009/0249301 A1 | 10/2009 | Kalla et al. |
| 2009/0265035 A1 | 10/2009 | Jenkinson et al. |
| 2009/0307531 A1 | 12/2009 | Karthikeyan et al. |
| 2009/0312009 A1 | 12/2009 | Fishel |
| 2010/0075664 A1* | 3/2010 | Maucksch .......... H04W 24/06 455/425 |
| 2010/0080143 A1 | 4/2010 | Topaltzas et al. |
| 2010/0088423 A1 | 4/2010 | Mazzagatte et al. |
| 2010/0094774 A1 | 4/2010 | Jackowitz et al. |
| 2010/0198402 A1 | 8/2010 | Greer et al. |
| 2010/0231738 A1 | 9/2010 | Border et al. |
| 2011/0010349 A1 | 1/2011 | Ellingson |
| 2011/0080940 A1 | 4/2011 | Bocharov et al. |
| 2011/0087924 A1 | 4/2011 | Kandula et al. |
| 2011/0113287 A1 | 5/2011 | Gururaj |
| 2011/0196735 A1* | 8/2011 | von Sydow .......... G06Q 30/02 705/14.43 |
| 2011/0263243 A1 | 10/2011 | Topaltzas et al. |
| 2011/0288964 A1 | 11/2011 | Linder et al. |
| 2011/0296009 A1 | 12/2011 | Baranov et al. |
| 2011/0302454 A1 | 12/2011 | Prophete et al. |
| 2011/0304634 A1 | 12/2011 | Urbach |
| 2011/0310041 A1 | 12/2011 | Williams et al. |
| 2011/0320879 A1 | 12/2011 | Singh et al. |
| 2012/0015723 A1 | 1/2012 | Lai |
| 2012/0070090 A1 | 3/2012 | Chang et al. |
| 2012/0109953 A1* | 5/2012 | Brown ................. G06Q 10/063 707/736 |
| 2012/0117139 A1* | 5/2012 | Lam ................... G06Q 30/0251 709/201 |
| 2012/0146956 A1 | 6/2012 | Jenkinson |
| 2012/0155292 A1 | 6/2012 | Zazula et al. |
| 2012/0188176 A1 | 7/2012 | Uzelac et al. |
| 2012/0191394 A1 | 7/2012 | Uzelac et al. |
| 2012/0198279 A1 | 8/2012 | Schroeder |
| 2012/0210242 A1 | 8/2012 | Burckart et al. |
| 2012/0221570 A1 | 8/2012 | Kalavade |
| 2012/0221893 A1 | 8/2012 | Bai et al. |
| 2012/0231785 A1 | 9/2012 | Poon et al. |
| 2012/0245918 A1 | 9/2012 | Overton et al. |
| 2012/0246515 A1 | 9/2012 | Lusenhop et al. |
| 2012/0254917 A1 | 10/2012 | Burkitt et al. |
| 2012/0265629 A1 | 10/2012 | Ayyagari |
| 2012/0266142 A1 | 10/2012 | Bokhari |
| 2012/0280934 A1 | 11/2012 | Ha et al. |
| 2012/0311569 A1 | 12/2012 | Shah |
| 2013/0002862 A1 | 1/2013 | Waring et al. |
| 2013/0029723 A1* | 1/2013 | Das .................... H04M 1/72569 455/557 |
| 2013/0132616 A1 | 5/2013 | Worthington et al. |
| 2013/0197862 A1 | 8/2013 | Uzelac et al. |
| 2013/0200917 A1 | 8/2013 | Panagas |
| 2014/0040035 A1* | 2/2014 | Cusack ................. G06Q 30/02 705/14.61 |
| 2014/0152584 A1 | 6/2014 | Matthews et al. |
| 2014/0281714 A1 | 9/2014 | Matthews et al. |

FOREIGN PATENT DOCUMENTS

| | | |
|---|---|---|
| EP | 2 369 481 | 9/2011 |
| EP | 2 492 814 | 8/2012 |
| EP | 2 515 526 | 10/2012 |
| JP | 2008-244688 | 10/2008 |
| WO | WO 2011/128514 | 10/2011 |
| WO | WO 2014/150306 | 9/2014 |

OTHER PUBLICATIONS

"Testdroid Recorder 2.0.9", Testing, Tools, Application Development Frameworks, and Mobile and Device Development, [no date], 3 pages.

Optofidelity Touch Panel Performance Test systems Brochure, dated Aug. 2013 available at http://www.optofidelity.com/wp-content/uploads/2013/09/OF_TPPT_general.pdf, 4 pages.

Optofidelity Test Automation Product Portfolio Brochure, dated May 2014 available at http://www.optofidelity.com/wp-content/uploads/2014/07/OF_ProductPortfolio_2014_En.pdf, 6 pages.

Video of Optofidelity Touch Panel Performance Tester, dated Oct. 15, 2012 available at https://www.youtube.com/watch?v=q_sxn1hZu78, 1 page.

Optofidelity Watchdog Brochure, dated Oct. 2013 available at http://www.optofidelity.com/wp-content/uploads/2013/11/OF_WatchDog_EN_www.pdf, 2 pages.

Optofidelity Measurement Services Brochure, dated Q1 2013 available at http://www.optofidelity.com/wp-content/uploads/2013/09/OF_MeasurementReport.pdf, 10 pages.

* cited by examiner

SYSTEM AND METHOD FOR ANALYZING USER EXPERIENCE OF A SOFTWARE APPLICATION ACROSS DISPARATE DEVICES

CROSS REFERENCE TO RELATED APPLICATIONS

This present application is a continuation of U.S. patent application Ser. No. 13/692,161, filed Dec. 3, 2012, which is hereby incorporated by reference in its entirety.

FIELD OF THE INVENTION

The invention relates to a system and method for analyzing a user experience of the execution of a software application across disparate devices to provide a more consistent user experience of the software application across disparate devices.

BACKGROUND OF THE INVENTION

The Android platform is an open source software stack for mobile phones and other devices. An Android Software Development Kit ("SDK") allows software developers to create applications that will run on the Android platform. Typically, Android applications are written in Java (a well-known programming language) and are compiled by the Android SDK tools, along with relevant data and resource files, into a single Android application package file. The Android application package file (hereinafter "apk") for an application may be used to distribute and install the software and middleware for the application to run on the Android operating system. An application's apk may hold the elements of the application, including, for example, program code for the application, resources, assets, certificates, a manifest file, and other elements.

The manifest file may include one or more components such as, for example, activities, services, content providers, broadcast receivers, and/or other components. An Android device may check an apk's manifest file to determine whether a component exists or should be associated with the application. The manifest file may also include application configuration information including, for example, information about permissions, application programming interface ("API") level, hardware requirements, software requirements, required API libraries, and/or other application configuration information. The manifest file may also contain information about how the application will run on different types of devices (e.g., by providing different layouts or scales for different screen sizes, different screen densities, and/or other device-specific configurations or features). When the Android device does not support the configurations in the manifest file, then the Android device may return an error or may use default settings. Conventionally, the manifest file (and the application's apk) may be created by application developers and delivered in a final form to the Android device for installation and use. The performance and scalability of the application may be considered by the application developers before making the application available for download and installation.

Because the Android platform is open source, numerous versions of the Android operating system ("OS") may be available. For example, a first version of the Android OS may run on a first mobile device, and a second version of the Android OS may run on a second mobile device, even though the first and second mobile devices may be identical in terms of hardware. In other examples, different versions of the Android OS may run on mobile devices with different hardware, or the same version of the Android OS may run on mobile devices with different hardware. The version of the Android OS running on a mobile device may be dependent mostly or solely on the time the OS was downloaded or installed on the mobile device, and/or when the user of the mobile device updated the OS. Some versions may be dependent on both time and/or hardware of the mobile device.

Typically, the Android platform may also include a non-public application protocol interface (API) named ViewServer which may enable the device or a client accessing the device to determine the view parameters of an application. Because this API is non-public, it may not be enabled on production devices (such as mobile phones or tablets sold in stores). Further, the ViewServer API may change at any time without warning in any version of Android, because it is a non-public API. This makes the API incredibly unreliable for application developers. The ViewServer API is also not designed for real-time interaction and may be very slow. The slowness of the API may be result, in part, because that the ViewServer API may return an entire view state of an application. The ViewServer API may also dispatch to the Android WindowManager to resolve view data, which may also contribute to slower speed while using the API.

Given the various versions of the Android OS that are available and running on mobile devices, an application may not run consistently on the available Android operating systems, even when the hardware across those mobile devices may be identical.

The user experience of the application may also vary across Android devices due to the variations between Android operating systems and/or device hardware on the Android devices.

These issues may also be relevant for developing software to run on other open source platforms as well.

Conventional systems for developing applications for use across a plurality of devices and/or operating systems suffer from these and other drawbacks.

SUMMARY OF THE INVENTION

The invention solving these and other drawbacks of conventional systems relates to a system and method for analyzing a user experience of the execution of a software application across disparate devices to provide a more consistent user experience of the software application across disparate devices.

A system for providing a consistent user experience of an application across disparate devices may comprise a computing device including a display analysis application, and one or more mobile devices including a display analysis application.

A display analysis application may be installed on a mobile device. The mobile device with the display analysis application installed thereon may include a memory that stores at least a version of an operating system, at least one application, and the display analysis application. The mobile device may include a network module configured to receive a query for one or more display parameters for an application with a display analysis patch from a display analysis application residing on the computing device. The mobile device may include a consistency module configured to access an application with the display analysis patch, obtain the one or more display parameters of the mobile device via the patched application, and transmit the obtained one or more display parameters to the display analysis application. The display parameters may include, for example, available widgets, screen characteristics, display characteristics of a window of an application, screen shots of a view of an application, and other parameters. The mobile device may also include a socket module configured to enable the mobile device to communicate via a multicast socket at the computing device. In some implementations, the mobile device may also include a patching module that patches an application's apk with the display analysis application.

A display analysis application may also reside on a computing device. The computing device and the mobile device may communicate over a network, or other communication channel. The computing device including the display analysis application may include at least a storage configured to store a plurality of display parameters, information about one or more mobile devices, application information, and one or more socket addresses. The computing device may also include a plurality of modules such as, for example, a patching and testing module configured to patch an application with an apk and/or transmit commands to be invoked by a mobile device, a network module configured to transmit and receive information from one or more mobile devices, a socket module configured to create at least a first socket to be used for communication with one or more mobile devices, and a consistency module configured to obtain and/or compare display parameters from one or more mobile devices.

In some implementations, the patching and testing module of the computing device may be configured to patch an application's apk with the display analysis application. For example, the patching and testing module may use a patch provided from the display analysis application on the computing device. The patching and testing module may update an application's apk with the patch. The patched apk may be communicated to a mobile device when the mobile device requests the application.

Alternatively, in an implementation in which a patching module is disposed at the mobile device, the patching module of the mobile device may be configured to patch an application's apk with a patch from the display analysis application of the mobile device. For example, the patching module may use a patch provided from the installation of the display analysis application on the mobile device. The patching module may update an application's apk with the patch. The patched apk may be used when the application is instantiated. The consistency module of the mobile device may be able to obtain a display parameter of the device via the patched application. For example, the display analysis application of the mobile device may run on a same thread as the application.

In some implementations, the patching and testing module of the computing device may also facilitate the invoking of a command on the mobile device. For example, the patching and testing module may request that the application invoke a command. In another example, the mobile device may invoke a command based on previous commands invoked by the mobile device. The command may include one or more instructions to be executed by the application to determine whether a specific type of view of the application is supported by the mobile device. In some implementations, the command may be invoked on the mobile device using a simulator or testing tool such as, for example, the Android Monkey tool. In some implementations, the consistency module of the mobile device may invoke the command and may transmit an indication to the computing device based on the results of the invoked command. Through a series of requests and responses from the computing device and the mobile device, respectively, the computing device may obtain one or more display parameters of the mobile device.

A socket module of the computing device may make available one or more local multicast sockets at which mobile devices including the patched application may listen and communicate data. A socket may typically be represented as a combination of an IP address and a port number, and may facilitate inter-process communication across a network. In some implementations, the socket module of the computing device may use a portion of an SHA-1 encoded string to represent the multicast socket. The socket module of the computing device may transmit the SHA-1 encoded string to mobile devices that have installed the display analysis application. A mobile device with the display analysis application installed may communicate with the computing device to receive the SHA-1 encoded string. In some implementations, 12 of the 40 bytes of the SHA-1 encoded string sent by the display analysis application may represent the address of the socket. One or more other bytes may represent the port number of the socket.

The networking module of the mobile device may connect to the computing device using one or more methods of authentication (e.g., using a shared secret). In other examples, the mobile device may receive a shared secret when installing the display analysis application on the device. The socket module of the mobile device may use a shared secret between the mobile device and the computing device to hash the SHA-1 encoded string sent by the socket module of the computing device. The socket module of the mobile device may then identify, using the SHA-1 encoded string, a multicast socket via which the mobile device and the computing device may communicate. The socket module of the mobile device may then connect to the multicast socket and thus be able to listen at the multicast socket and/or broadcast information to the multicast socket.

In some implementations, the mobile device may receive an application from the computing device. The apk of the application may be patched with a patch from the display analysis application on the computing device. The consistency module of the mobile device may access the patched application after it has been received. In some implementations, the consistency module of the mobile device may receive one or more commands to invoke from the computing device. The consistency module may then transmit one or more display parameters to the computing device based on an invocation of the one or more received commands.

For example, the consistency module may broadcast the display parameters at a multicast socket created by the socket module of the computing device. The consistency module of the computing device may then compare display parameters of the mobile device with one or more display parameters stored at the computing device (or broadcast at the multicast socket). Based on the comparison, the consistency module of the computing device may transmit an indication to the mobile device regarding whether display parameters of the mobile device match display parameters at the computing device. The display parameters broadcast at the multicast socket may be from one or more other devices that include the display analysis application and the patched application.

In another example, the consistency module of the mobile device may obtain display parameters broadcast at the computing device and may compare the broadcast display parameters with the display parameters of the mobile device. The consistency module of the computing device may also store the broadcast display parameters at a storage module of the computing device. The consistency module of the computing device may also associate the broadcast display parameters with the socket at which the display parameters were broadcast.

By enabling mobile devices to transmit and/or compare display parameters, a consistency module of the computing device may track a display produced by the execution of the patched application on one or more of the mobile devices.

A consistent execution of the patched application across similar devices may be monitored and/or enabled. For example, the execution of the patched application across similar devices may be monitored by the computing device. The computing device may store information related to the execution of the patched application across similar devices. The computing device may also store whether one or more devices (and/or one or more types of devices) have a consistent execution of the patched application.

The computing device may store the results of an execution of the patched application across multiple devices. For example, the computing device may store information relating to a disparate execution of the patched application across one or more devices. The computing device may analyze the stored information related to the disparate execution of the patched application. The computing device may also analyze the stored information to determine a number of disparate executions. The computing device may also analyze the stored information to determine a percentage of devices associated with a disparate execution of the patched application.

The computing device may compare the stored information relating to a first patched application with stored information relating to a second patched application. For example, the computing device may compare whether the first application or the second application has a larger number of disparate executions. Other analyses may also be performed.

The mobile device may receive data relating to the execution of an application executing on the device. The data may be broadcast at the multicast socket or may be received from the computing device. In some implementations, the computing device may analyze the display parameters received from mobile device and may develop a patch for the application to run on mobile device based on that analysis. The patch may tailor the execution of the application on the mobile device to use the display parameters included in the patch. Alternatively, the computing device may transmit program code or other functional language to the mobile device that enables the mobile device to support the display parameters produced by the execution of the application. Other types of data may also be sent to the mobile device to enable an execution of the application on mobile device.

The consistency module of the mobile device may compare the display parameters of its device with display parameters broadcast from one or more other mobile devices via the multicast socket. In some implementations, the mobile devices connected via a multicast socket may arbitrarily choose one mobile device (e.g., the device with the lowest or highest device serial number) as an "Alpha" device.

Mobile devices connected via the multicast socket may compare their respective display parameters with display parameters broadcast at the socket by the Alpha device. For example, the Alpha device may invoke a command on the device via the Android Monkey tool. In another example, the patching and testing module of the computing device may transmit a command to be invoked to the Alpha device. The Alpha device may broadcast at the multicast socket a SHA-1 encoded serial representation of the display parameters relating to a view of the application on the device based on the invoked command. The Alpha device and/or the patching and testing module of the computing device may also broadcast the command at the multicast socket. In some implementations, the patching and testing module of the computing device may store the invoked commands at the storage and associate the invoked commands with the multicast socket. A mobile device that is also connected to the multicast socket may invoke the same command on its device. The mobile device may then compare the display parameters based on the invoked command with the Alpha device's broadcast display parameters.

The commands invoked by the Alpha device may be similar to the commands invoked by the mobile device in its communication with computing device detailed above. For example, a command invoked at the Alpha device may be based on one or more previous commands executed by the Alpha device. The patching and testing module may maintain a predetermined list of commands to be invoked by an Alpha device for a specific application. In some implementations, these commands may relate to the patched application to be executed on the Alpha device. The predetermined list of commands may also encompass a variety of different display parameters that may result from execution of the patched application on a variety of different mobile devices. The commands may also relate to the actions available on one or more mobile devices. The commands sent by the patching and testing module may also be based on one or more previous commands invoked by the Alpha device.

When display parameters of the mobile device match display parameters of the Alpha device after invoking the command, the mobile device may continue to listen at the multicast socket at which the Alpha device broadcasts its display parameters. The Alpha device may continue to broadcast, at the multicast socket, the commands that it invokes and/or the resultant display parameters for the respective commands. The consistency module of the mobile device may continue to invoke the same commands as the Alpha device and compare its resultant display parameters with those of the Alpha device. For example, the consistency module of the mobile device may invoke the same commands as the Alpha device until its resultant display parameters no longer match those of the Alpha device, or until the Alpha device has invoked all of the commands in a predetermined list.

The mobile devices that match the display parameters of the Alpha device after a list of commands have been invoked may be considered to be in a same pack as the Alpha device and may appear to have the same display functionality (e.g., same screen size, chipset, vendor, and/or other display functionality) as the Alpha device. In some implementations, the computing device may store which devices (and/or which types of devices) are in one or more packs.

In some implementations, the mobile device may receive data relating to the execution of an application executing on the device. The data may be based on the pack in which the mobile device fits. The data may be broadcast at the multicast socket, or may be received from the computing device. In some implementations, the computing device may analyze the display parameters associated with an Alpha device in the pack and may develop a patch for the application to run on the mobile device based on that analysis. The patch may tailor the execution of the application on the mobile device to use the display parameters of the Alpha device. Alternatively, the computing device may transmit program code or other functional language to the mobile device that enables the mobile device to support the display parameters produced by the execution of the application. Other types of data may also be sent to the mobile device to enable an execution of patched application on the mobile device. The data sent to the mobile device may be data obtained from an analysis of the Alpha device. In some implementations, some or all of the mobile devices in the pack may receive the data relating to execution of the application on the Alpha device.

The display parameters of the mobile device may not match the display parameters of the Alpha device after one or more of the list of commands has been invoked. As a result, the consistency module of the mobile device may communicate with the socket module of the computing device to obtain a new multicast address (e.g., the next multicast address available). The consistency module of the mobile device may listen for a new Alpha device at the new multicast socket. For example, the socket module of the mobile device may communicate an indication of the mismatch to the socket module and/or consistency module of the computing device. In some implementations, the socket module of the computing device may create another multicast socket and may communicate an SHA-1 string identifying the multicast socket to the socket module of the mismatched mobile device. The socket module of the computing device may also maintain a plurality of multicast sockets and may communicate information identifying another multicast socket to the socket module of the mismatched mobile device when pinged.

Other objects and advantages of the invention will be apparent to those skilled in the art based on the following drawings and detailed description.

DETAILED DESCRIPTION

A system and method for analyzing consistency of a user experience of a software application across disparate mobile devices may be provided. In some implementations, the disparate mobile devices may run one or more versions of an operating system like the Android OS, and the software application may be developed to run on one or more versions of an operation system and/or one or more types of hardware.

Figure 1:
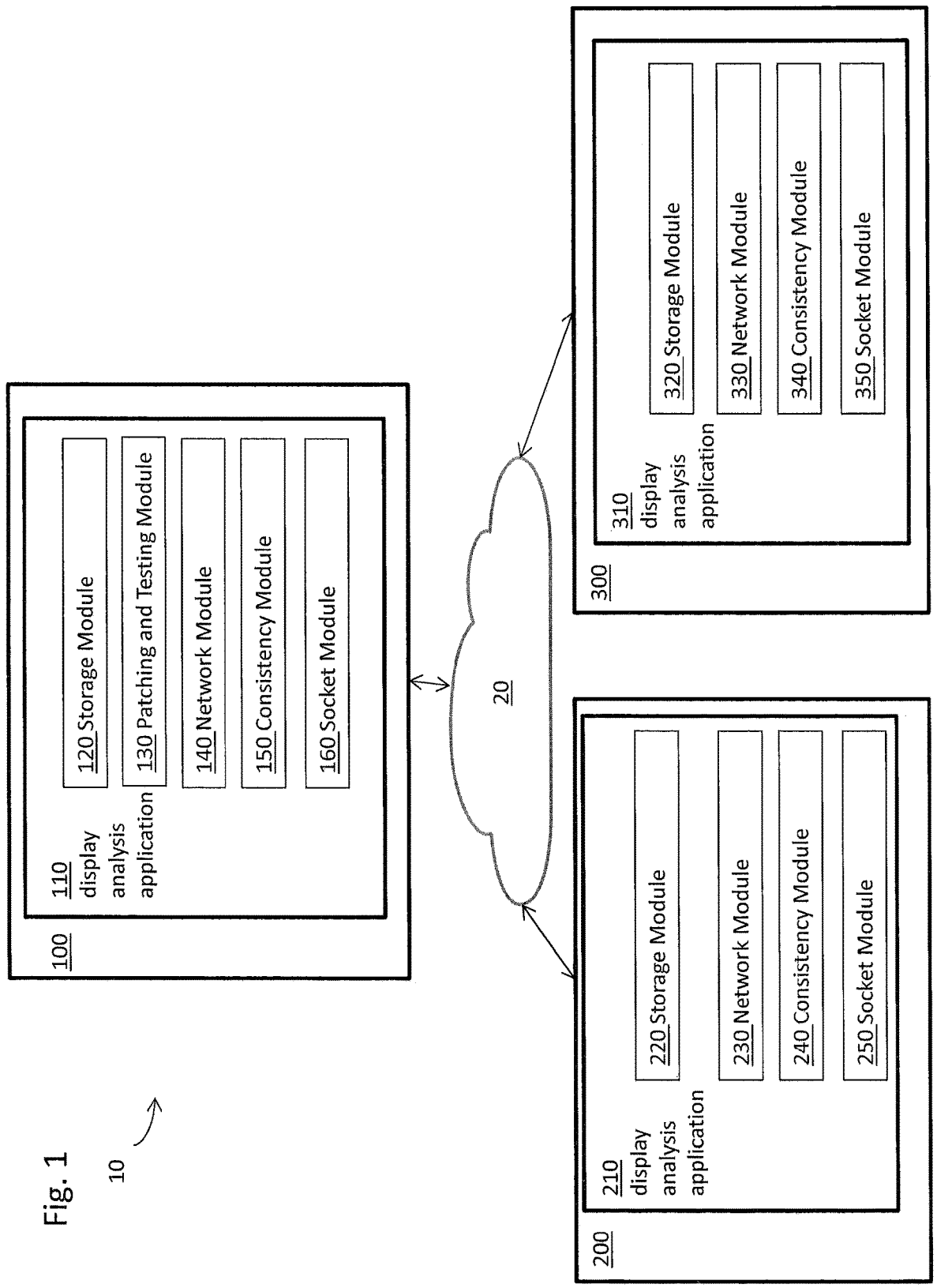
FIG. 1 illustrates an exemplary diagram of a system for analyzing a user experience of a software application across disparate devices, according to an aspect of the invention.

FIG. 1 illustrates an exemplary diagram of a system 10 for analyzing a user experience of a software application across disparate mobile devices 200, 300, according to an implementation of the invention. System 10 may include a network 20, one or more computing devices 100, and a plurality of mobile devices 200, 300.

Computing device 100 may include a display analysis application 110. Computing device 100 (including display analysis application 110) may include a storage 120 configured to store a plurality of display parameters and a plurality of socket addresses associated with a respective one or more mobile devices and/or display parameters. Computing device 100 may also include a plurality of modules such as, for example, a patching and testing module 130 configured to patch an application with a display analysis patch and to transmit commands to be invoked by a mobile device, a network module 140 configured to transmit and receive information from one or more mobile devices, a socket module 160 configured to create at least a first socket to be used for communication with one or more mobile devices, and a consistency module 150 configured to determine whether a response received from a mobile device corresponds to a display parameter associated with the first socket. The display parameters may include, for example, available widgets, screen characteristics, display characteristics of a window, screen shots of a view of an application, and other parameters.

Computing device 100 may be any computing device such as, for example, a server, a desktop computer, laptop computer, personal digital assistant, smart phone, tablet, and/or any other computing device. Computing device 100 may be capable of communicating with one or more mobile devices 200, 300 over network 20. Network 20 may be a public or private network or any other suitable communication channel. Computing device 100 may also include other components typically found in computing devices, including, for example, user input features (e.g., a touch screen, microphone, keyboard, and/or other user input features), speakers, an antenna (and the corresponding signal processing capabilities), and other features. Other computing devices at system 10 may include similar features.

Mobile devices 200, 300 may include respective display analysis applications 210, 310. Mobile device 200 (with display analysis application 210) may include a storage 220 that stores at least a version of an operating system, at least one application, and the display analysis application. Mobile device 200 may also include a network module 240 configured to receive an application with an apk patched by patching and testing module 130 of the computing device 100. Network module 240 may also be configured to receive a query for one or more display parameters for a patched application from a display analysis application 110 residing on computing device 100. Mobile device 200 may also include a consistency module 250 configured to access the patched application, to obtain display parameters of mobile device 200 via the patched application, and to transmit the obtained display parameters to computing device 100. Mobile device 200 may also include a socket module 260 configured to enable mobile device 200 to communicate via a socket at computing device 100.

Mobile device 200 may be any mobile device such as, for example, a personal digital assistant, smart phone, tablet, and/or other mobile device. Mobile device 200 may be capable of communicating with one or more mobile devices (e.g., mobile device 300) and one or more computing devices (e.g., computing device 100) over a network 20 such as, for example, a public or private network, or any other suitable communication channel. Mobile device 200 may also include other components typically found in mobile devices, including, for example, user input features (e.g., a touch screen, microphone, keyboard, and/or other user input features), speakers, an antenna (and the corresponding signal processing capabilities), and/or other features. Other mobile devices (e.g., mobile device 300) may include similar features.

The system of FIG. 1 is exemplary in nature and should not be viewed as limiting. For example, implementations of the invention may be made in hardware, firmware, software, or any suitable combination thereof. Aspects of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Further, firmware, software, routines, or instructions may be described herein in terms of specific exemplary aspects and implementations of the invention, and performing certain actions. However, it will be apparent that such descriptions are merely for convenience and that such actions in fact result from computing devices, processors, controllers, or other devices executing the firmware, software, routines, or instructions.

Figure 2:
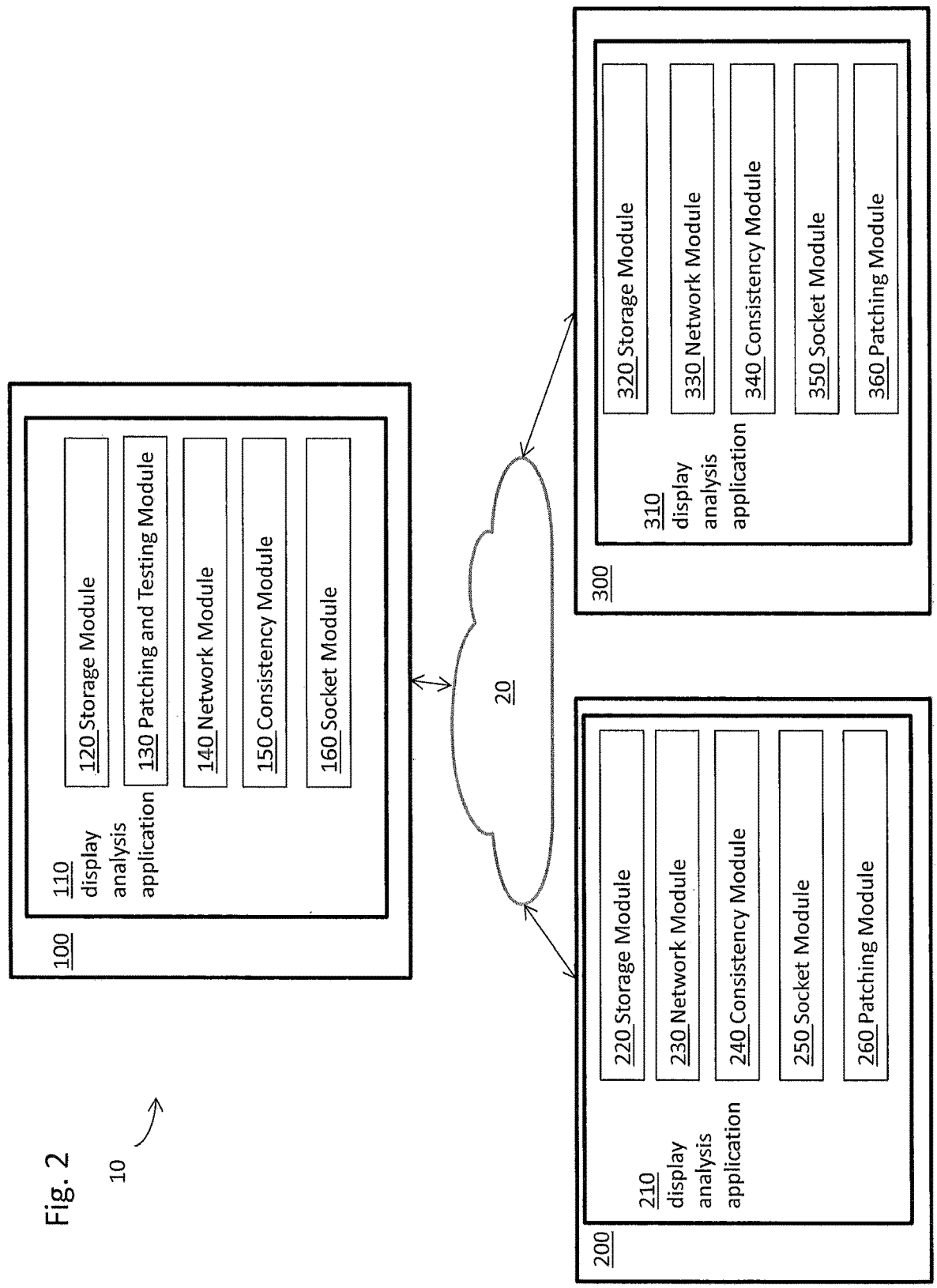
FIG. 2 illustrates another exemplary diagram of a system for analyzing a user experience of a software application across disparate devices, according to an aspect of the invention.

FIG. 2 illustrates an exemplary diagram of a system 10 for analyzing a user experience of a software application across disparate devices 200, 300, according to an implementation of the invention. The system illustrated in FIG. 2 is similar to the system illustrated in FIG. 1 with at least the following differences. In some implementations, mobile device 200 (with display analysis application 210) may include a patching module 230 that patches an application's apk with display analysis application 210 of mobile device 200. For example, the patching module 230 may use a patch provided from the installation of the display analysis application 210 on the mobile device 200. The patching module 230 may update an application's apk with the patch. The patched apk may be used when the application is instantiated. The display analysis application 210 may run on a same thread as the application. The consistency module 250 of the mobile device 200 may be able to obtain a display parameter of the patched application.

Figure 3:
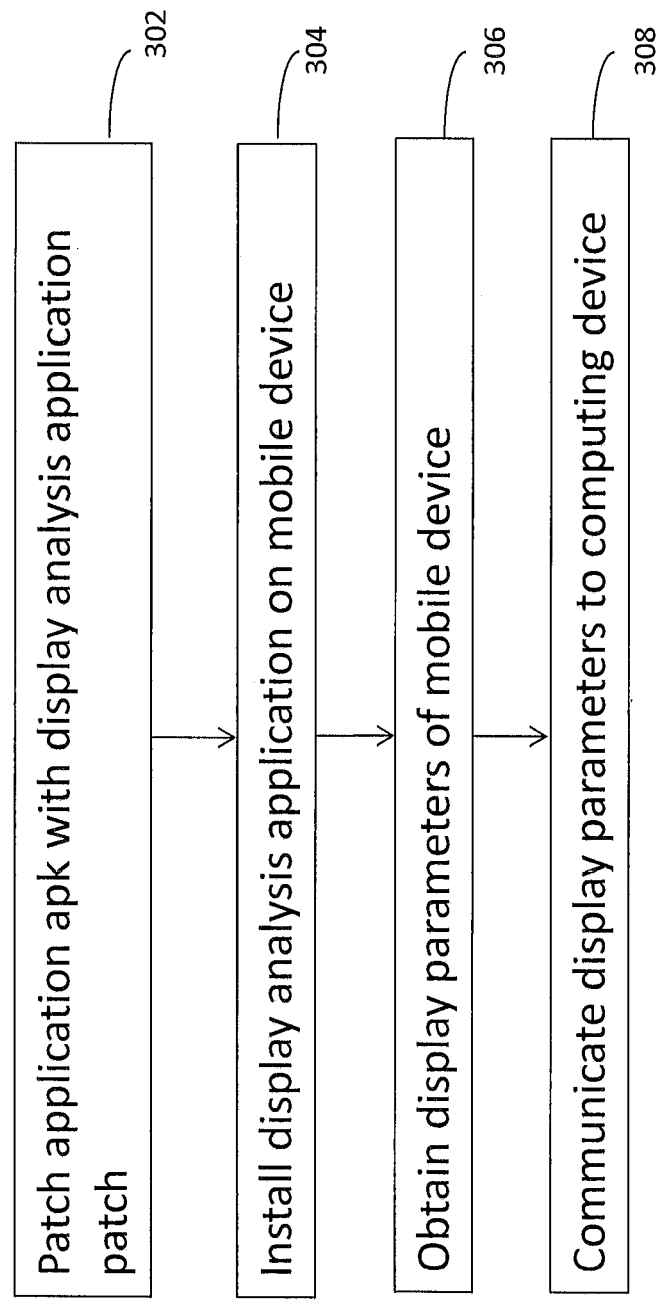
FIG. 3 illustrates a flowchart of an exemplary method of analyzing a user experience of an application on mobile device, according to an aspect of the invention.

FIG. 3 illustrates a flowchart of an exemplary method of analyzing a user experience of an application on mobile device 200. The various processing operations depicted in the flowchart of FIG. 3 are described in greater detail herein. The described operations may be accomplished using some or all of the system components described in detail above and, in some implementations, various operations may be performed in different sequences. In other implementations, additional operations may be performed along with some or all of the operations shown in FIG. 3, while some operations may be omitted. In yet other implementations, one or more operations may be performed simultaneously. Accordingly, the operations as illustrated (and described in greater detail below) are exemplary in nature and, as such, should not be viewed as limiting.

In an operation 302, patching and testing module 130 of computing device 100 may be configured to update an application's apk with a patch from display analysis application 110. For example, patching and testing module 130 may provide a patch to the application's apk in a manner similar to a patch provided to an application to plug a security leak, or to upgrade features. The patched apk may be used when the application is instantiated. In some implementations, mobile device 200 may receive an application without an apk that has been updated with a patch. In these implementations, patching module 230 of mobile device 200 may be configured to patch the application's apk with display analysis application 210.

In an operation 304, mobile device 200 may install display analysis application 210. For example, network module 240 of mobile device 200 may download display analysis application 210 from computing device 100 or from another computing device or repository that stores applications for download. Display analysis application 210 may be downloaded as an apk (or a portion thereof) and may be installed like a conventional Android application. In some implementations, display analysis application 210 may be installed on mobile device 200 during an initial software install on mobile device 200. For example, the display analysis application 210 may be installed on mobile device 200 before mobile device 200 is made available to a consumer for purchase. Display analysis application 210 may also be included as part of an Android operating system that runs on mobile device 200.

When display analysis application 210 is installed on mobile device 200, mobile device 200 may transmit information to computing device 100 regarding at least an operating system version running on mobile device 200, a serial number of mobile device 200, and/or other characteristics of mobile device 200. Computing device 100 may store the information transmitted by mobile device 200 in storage 120.

In an operation 306, consistency module 250 of mobile device 200 may be configured to access the patched application and obtain one or more display parameters of the patched application running on mobile device 200. In some implementations, patching and testing module 130 of computing device 100 may request that the mobile device 200 transmit display parameters relating to a screen view of the patched application after the invocation of a command. Consistency module 250 may also transmit display parameters relating to a screen view of the application to computing device 100 when a display of the application changes (e.g., because a command was invoked, because the screen was refreshed, and/or for other reasons). The display parameters may include, for example, available widgets, screen characteristics, display characteristics of a window, and/or other parameters.

In some implementations, the command (for obtaining a display parameter) may be Activity.getWindow( ).getDecorview( ) or another similar command. In an Android application, a view may occupy a portion of the screen and may include one or more widgets. Widgets may be used to create interactive user interface components. Widgets may include, for example, buttons, text fields, scrolling lists, and/or other components. By executing a command to get display parameters relating to a screen view of the application, mobile device 200 may determine which display parameters (e.g.

widgets, screen resolution characteristics, and/or other display parameters) are available for the application.

Mobile device 200 may obtain and communicate display parameters relating to a screen view of the application after receiving a command to invoke from patching and testing module 130 of computing device 200. The command may include one or more instructions to be executed by the patched application to determine whether a specific display parameter or set of display parameters relating to a screen view of the application is supported by mobile device 200.

In some implementations, patching and testing module 130 may transmit a request to mobile device 200 to invoke commands by the patched application. The command transmitted from patching and testing module 130 may be based on one or more previous commands executed by mobile device 200. Mobile device 200 may obtain the display parameters relating to a screen view of the application display after invoking the command and communicate those display parameters to computing device 100. The mobile device 200 may obtain and communicate display parameters relating to a screen view after every command that it invokes.

In some implementations, patching and testing module 130 may maintain one or more predetermined lists of commands to be invoked by mobile device 200 for one or more respective patched applications. Storage module 120 and/or storage module 220 may store the lists of commands for the respective patched applications to execute. In some instances, the list of commands may be sent by computing device 100 to mobile device 200. In some instances, the list of commands may be received during the installation of display analysis application 210 on mobile device 200. The list of commands may be received by mobile device 200 via other methods as well. In some implementations, the execution of the predetermined list of commands may result in a variety of different display parameters. The display parameters produced by executing the predetermined list of commands may vary based on the mobile device (e.g., mobile devices 200, 300) on which the commands are executed.

In some implementations, the commands may be invoked on mobile device 200 using a testing tool such as, for example, the Android Monkey tool ("Monkey"). Monkey is a command-line tool that can be run on an emulator instance or on a device. Monkey may be configured to transmit a pseudo-random string of user events to a device or an instance running on a device and may perform a "stress test" of the instance. Monkey may also communicate the response of the device or the emulator to the component from which it was invoked. Monkey may be used by display analysis application 110 and/or display analysis application 210 to run specific tests on mobile device 200 and/or to invoke specific commands on mobile device 200.

In an operation 308, mobile device 200 may communicate the display parameters obtained from invoking one or more commands to computing device 100. For example, consistency module 250 may transmit a serialized version of the display parameters relating to a screen view to computing device 100. This serialized version of the display parameters may then be compared to other serialized versions of display parameters stored at computing device 100. Mobile device 200 may communicate the display parameters relating to a screen view obtained for each invoked command separately or may communicate all of the display parameters obtained after invoking each of the commands transmitted from computing device 100. In some implementations, mobile device 200 may communicate one or more or all portions of the obtained display parameters to computing device 100. Computing device 100 may store some or all of the received display parameters in storage 220.

In some implementations, the display parameters are communicated to computing device 100 after an authenticated connection is made between mobile device 200 and computing device 100. Networking module 240 of mobile device 200 may connect to computing device 100 using one or more methods of authentication (e.g., using a shared secret). In some implementations, commands may be received from computing device 100 only after an authenticated connection is established. For example, mobile device 200 may receive a shared secret that facilitates authenticated connection with computing device 100 when installing display analysis application 210 on mobile device 200.

Network module 140 of computing device 100 may include one or more ports for communication. Mobile device 200 may communicate with computing device 100 via the one or more ports of network module 140. For example, computing device 100 may include a first port associated with a multicast socket created by socket module 160. In another example, computing device 100 may have a second port used by patching and testing module 130 of computing device to transmit commands to mobile device 200. Computing device 100 may have several ports used by patching and testing module 130, where each port may be associated with a different mobile device 200, 300. In some implementations, default ports may be used by computing device 100. For example, port 4939 may be used as a default port for the first port.

In some implementations, one instance of display analysis application 210, 310 is launched per mobile device 200, 300, respectively. Multiple mobile devices (e.g., mobile devices 200, 300) may connect to a computing device (e.g. computing device 100) with display analysis application 210 via respective unique local port numbers of computing device 100. Multiple applications on mobile device 200 may each have a respective apk updated with a patch from the display analysis application 210. In some implementations, the same display analysis application patch may be used for all applications on mobile device 200. In some instances, only one patched application may be instantiated or launched at a time, as the display analysis application patch may direct an application to a same local port at computing device 100. In these implementations, when more than one patched application is launched or instantiated at a same time, the local port may experience collisions.

Mobile device 200 may receive data for execution of the patched application from computing device 100. For example, the data received from computing device 100 may enable an execution of the patched application on mobile device 200. Computing device 100 may analyze the display parameters received from mobile device 200 and may develop a patch for the application to run on mobile device 200 based on that analysis. The patch may tailor the execution of the application on mobile device 200 to use the display parameters available on mobile device 200. Alternatively, computing device 100 may transmit program code or other functional language to mobile device 200 that enables mobile device 200 to support the display parameters produced by the execution of the application. Other types of data may also be sent by computing device 100 to mobile device 200 to enable an execution of patched application on mobile device 200.

In some implementations, patching module 230 of mobile device 200 may patch the data received from computing device 100 to the application's apk. For example, patching module 230 may remove the patch from display analysis application 210 and replace the display analysis application patch with the patch received from computing device 100. In some examples, patching module 230 may patch the application's apk with the patch received from computing device 100 in addition to the initial patch from the display analysis application 210. For example, patching module 230 may update the patched apk with the patch received from computing device 100 (e.g., not remove the initial patch from display analysis application 210 that was first used to update the application's apk). In some implementations, patching module 230 may integrate the data received from computing device 100 with the application to enable the application to be fully functional. For example, the application may rely on program code received from computing device 100 to support one or more display parameters that mobile device 200 does not support.

Figure 4:
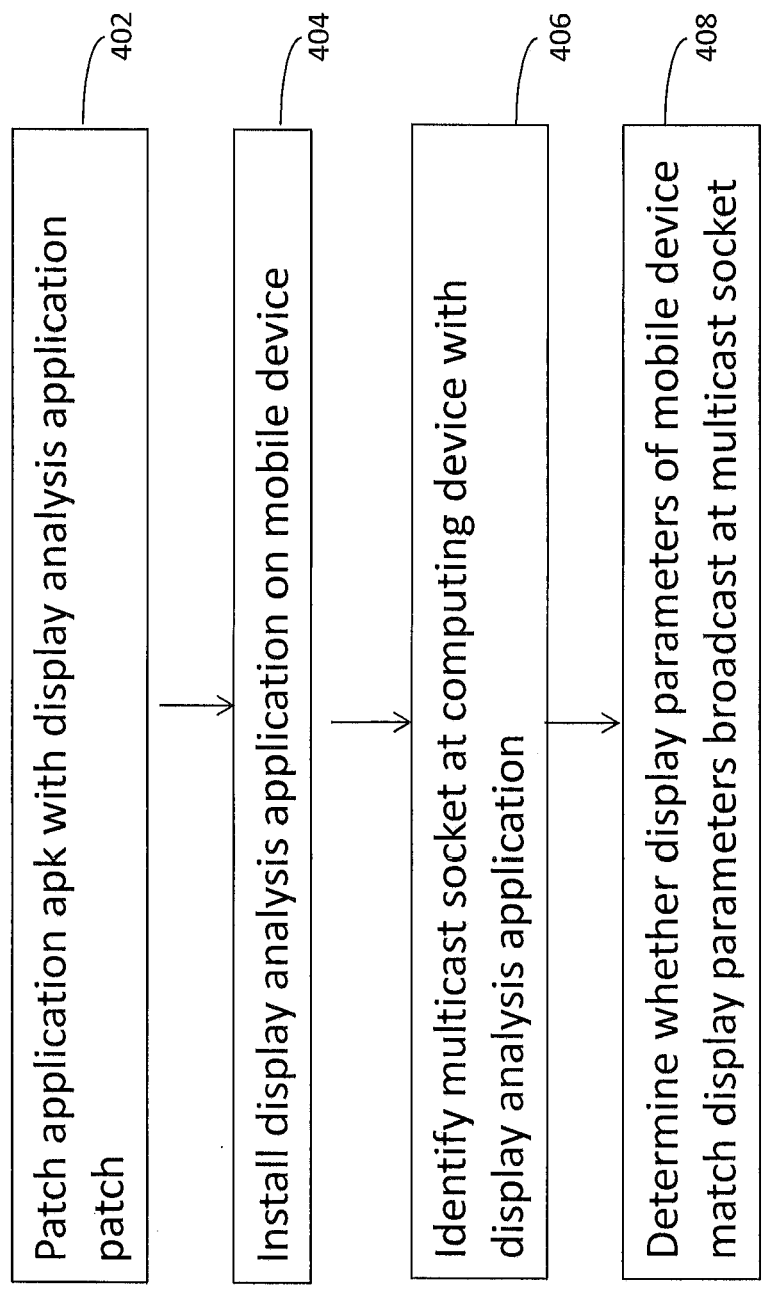
FIG. 4 illustrates a flowchart of an exemplary method of analyzing a user experience of an application on mobile device in a system with multiple mobile devices, according to an aspect of the invention.

FIG. 4 illustrates a flowchart of an exemplary method of analyzing a user experience of an application on mobile device 200 in a system 10 with multiple mobile devices 200, 300. The various processing operations depicted in the flowchart of FIG. 4 are described in greater detail herein. The described operations may be accomplished using some or all of the system components described in detail above and, in some implementations, various operations may be performed in different sequences. In other implementations, additional operations may be performed along with some or all of the operations shown in FIG. 4, while some operations may be omitted. In yet other implementations, one or more operations may be performed simultaneously. Accordingly, the operations as illustrated (and described in greater detail below) are exemplary in nature and, as such, should not be viewed as limiting.

Many of the operations set forth in FIG. 4 are similar to those discussed above in relation to FIG. 3. For example, operations 402 and 404 are similar to operations 302 and 304, respectively, and therefore will not be described again.

In an operation 406, socket modules 260, 360 of mobile devices 200, 300 may identify a multicast socket at computing device 100. Socket module 160 of computing device 100 may make available a local multicast socket. Mobile devices (like mobile devices 200, 300 that include the patched application) may listen and broadcast data at the local multicast socket. In some implementations, socket module 160 may use a portion of an SHA-1 encoded string to represent the multicast socket. Socket module 160 may transmit the SHA-1 encoded string to mobile devices 200, 300 that have installed display analysis application 210, 310. Mobile devices 200, 300 may communicate with computing device 100 to receive the SHA-1 encoded string. In some implementations, 12 of the 40 bytes of the SHA-1 encoded string sent by computing device 100 may represent the address of the socket. One or more other bytes may represent the port number of the socket.

Networking modules 240, 340 of mobile devices 200, 300 may connect to computing device 100 using one or more methods of authentication (e.g., using a shared secret). In other examples, mobile devices 200, 300 may receive a shared secret when installing display analysis applications 210, 310 on respective mobile devices 200, 300. Socket modules 260, 360 of mobile devices 200, 300 may use a respective shared secret between mobile device 200 (or mobile device 300) and computing device 100 to hash the SHA-1 encoded string sent by socket module 160 of computing device 100. Socket modules 260, 360 of mobile devices 200, 300 may then identify a multicast socket via which mobile devices 200, 300 and computing device 100 may communicate. Socket modules 260, 360 of mobile devices 200, 300 may connect to the multicast socket and thus be able to listen at the multicast socket and/or broadcast information to the multicast socket.

In operation 408, consistency modules 250, 350 of mobile devices 200, 300 may be configured to determine when a display parameter relating to a screen view of an application on respective mobile devices 200, 300 match a display parameter broadcast at the multicast socket. Consistency modules 250, 350 may be configured to obtain respective display parameters relating to a screen view of an application on respective mobile devices 200, 300 via the patched application. Consistency modules 250, 350 of mobile devices 200, 300 and/or consistency module 150 of computing device 100 may be configured to determine when a display parameter relating to a screen view of an application on mobile device 200 or mobile device 300 matches a display parameter broadcast at the multicast socket.

In some implementations, mobile devices 200, 300 may receive data for execution of the patched application from computing device 100. For example, the data received from computing device 100 may enable an execution of the patched application on mobile device 200 or mobile device 300. Computing device 100 may analyze the display parameters received from mobile devices 200, 300 and may develop a patch for the application to run on one or more of mobile device 200 and mobile device 300 based on that analysis. The patch may tailor the execution of the application on mobile devices 200, 300 to use the display parameters available on respective mobile devices 200, 300. Alternatively, computing device 100 may transmit program code or other functional language to mobile devices 200, 300 that enable mobile devices 200, 300 to support the respective display parameters produced by the execution of the application. Other types of data may also be sent by computing device 100 to mobile devices 200, 300 to enable an execution of patched application on mobile devices 200, 300.

Patching modules 230, 330 of mobile devices 200, 300 may patch the data received from computing device 100 to the application's apk. For example, patching modules 230, 330 may remove the patch from display analysis applications 210, 310 and replace the display analysis application patch with the patch received from computing device 100. In some examples, patching modules 230, 330 may patch the application's apk with the patch received from computing device 100 in addition to the initial patch from display analysis applications 210, 310. For example, patching modules 230, 330 may update the patched apk with the patch received from computing device 100 (e.g., not remove the initial patch from display analysis applications 210, 310 that was first used to update the application's apk). Patching modules 230, 330 may integrate the data received from computing device 100 with the application to be fully functional. For example, the application may rely on program code received from computing device 100 to support one or more display parameters that mobile devices 200, 300 do not support.

In an operation 408, a determination is made whether the display parameters of one or more of mobile devices 200, 300 match the display parameters broadcast at the local multicast socket at computing device 100.

Figure 5:
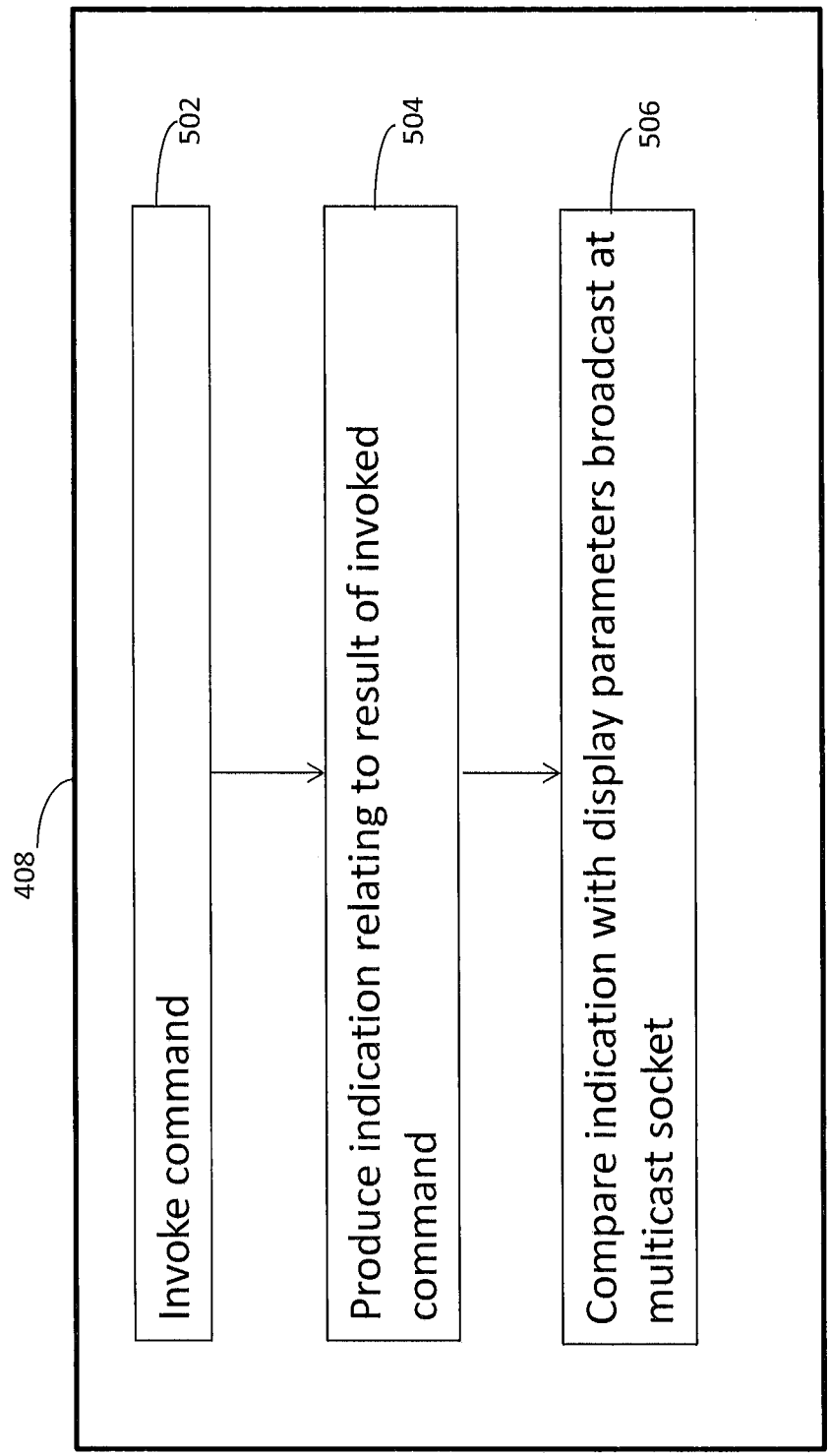
FIG. 5 illustrates a flow chart of an exemplary method of determining whether a display parameter of a mobile device matches a display parameter broadcast at the multicast socket, according to an aspect of the invention.

FIG. 5 illustrates a flow chart of an exemplary method of determining whether a display parameter of mobile device 200 matches a display parameter broadcast at the multicast socket. A similar method may be used to determine whether a display parameter of mobile device 300 matches a display parameter broadcast at the multicast socket. The various processing operations depicted in the flowchart of FIG. 5 are described in greater detail herein. The described operations may be accomplished using some or all of the system components described in detail above and, in some implementations, various operations may be performed in different sequences. In other implementations, additional operations may be performed along with some or all of the operations shown in FIG. 5, while some operations may be omitted. In yet other implementations, one or more operations may be performed simultaneously. Accordingly, the operations as illustrated (and described in greater detail below) are exemplary in nature and, as such, should not be viewed as limiting.

As part of operation 408, a command may be invoked at mobile device 200 in an operation 502. In some implementations, consistency module 250 of mobile device 200 may produce an indication relating to the result of the invoked command in an operation 504. The produced indication may be compared with display parameters broadcast at the multicast socket of computing device 100 in an operation 506.

Figure 6:
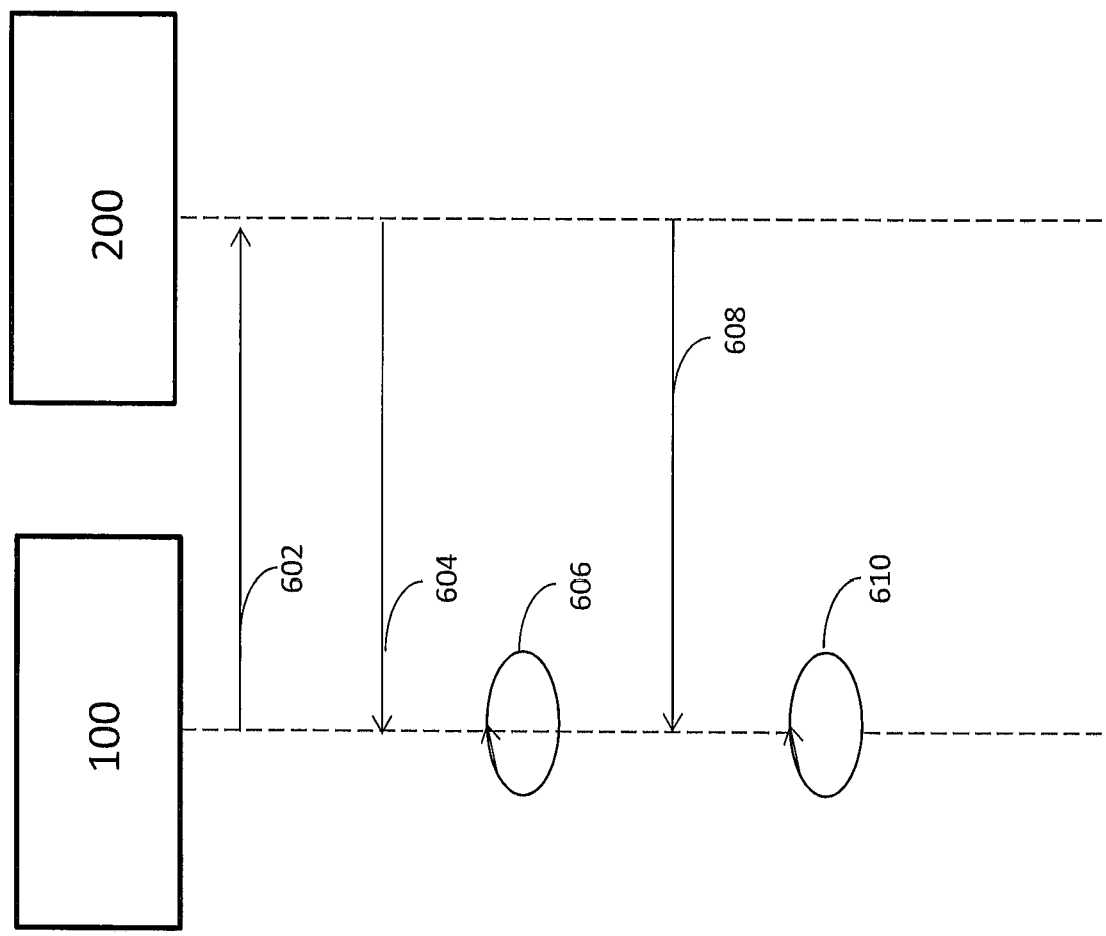
FIG. 6 illustrates a data flow diagram of an exemplary method of invoking a command at mobile device and producing an indication relating to the result of the invoked command by a mobile device, according to an aspect of the invention.

FIG. 6 illustrates a data flow diagram of an exemplary method of invoking a command at mobile device 200 (e.g., as discussed in operation 502) and producing an indication relating to the result of the invoked command by mobile device 200 (e.g., as discussed in operation 504). The various processing operations depicted in the flowchart of FIG. 6 are described in greater detail herein. The described operations may be accomplished using some or all of the system components described in detail above and, in some implementations, various operations may be performed in different sequences. In other implementations, additional operations may be performed along with some or all of the operations shown in FIG. 6, while some operations may be omitted. In yet other implementations, one or more operations may be performed simultaneously. Accordingly, the operations as illustrated (and described in greater detail below) are exemplary in nature and, as such, should not be viewed as limiting.

Patching and testing module 130 of computing device 100 may transmit a request for display parameters relating to a screen view of the patched application of mobile device 200 in an operation 602. For example, the request may invoke display analysis application 210 and/or consistency module 250 to execute a command to obtain information related to a view of a screen related to the patched application. In another example, consistency module 250 may transmit to computing device 100 one or more display parameters relating to a screen view of the patched application when a display of the patched application changes (e.g., because a command was invoked, because the screen was refreshed, and/or for other reasons). Patching and testing module 130 may transmit a request to mobile device 200 to invoke commands relating to the application. Mobile device 200 may communicate a command at the multicast socket at an operation 604. The command from mobile device 200 may be based on one or more previous commands executed by mobile device 200. Mobile device 200 may also broadcast the command at the multicast socket in an operation 606. Computing device 100 may also store the command at storage 120 and associate the command with the multicast socket and/or with any display parameters broadcast after the command.

In some implementations, patching and testing module 130 may maintain a predetermined list of commands to be invoked by mobile device 200 for a specific application. The predetermined list of commands may be similar to the list discussed above with respect to operation 306. Similarly, in some implementations, the commands may be invoked on mobile device 200 using Monkey as discussed above.

In an operation 606, the command sent by testing module 130 may also be broadcast at the multicast socket. The command (for obtaining the display parameter) may be Activity.getWindow( ).getDecorview( ) or another similar command. In an Android application, a view may occupy a portion of the screen and may include one or more widgets. Widgets may be used to create interactive user interface components. Widgets may include, for example, buttons, text fields, scrolling lists, and/or other components. By executing a command to get display parameters relating to a screen view of the patched application, mobile device 200 may determine which display parameters (e.g., widgets, screen resolution characteristics, and/or other display parameters) are available for the application. The command may include one or more instructions to be executed by the patched application to determine whether a specific type of view of the patched application is supported by mobile device 200.

Consistency module 250 of mobile device 200 may receive the command to be invoked and may transmit an indication to computing device 100 based on the results of the invoked command at operation 608. The indication may refer to the display parameters that relate to a screen view of the patched application after invoking the command. The indication may comprise the display parameters relating to a screen view of the patched application after invoking the command. The indication may also comprise a determination of whether the invoked command produced one or more display parameters that were supported by mobile device 200. For example, when the command required the display of an object at a resolution outside of the resolution specification of mobile device 200, consistency module 250 may transmit an indication that mobile device 200 does not support a specific display parameter (e.g. the specific resolution) resulting from the invoked command. In some instances, consistency module 250 may transmit a plurality of indications after invoking the command sent by computing device 100 at operation 608. The plurality of indications may comprise a separate indication for each display parameter in the display produced by invoking the command on mobile device 200.

Returning to FIG. 5, in an operation 506, the indication produced by mobile device 200 may be compared with other indications broadcast at the multicast socket of computing device 100. The data comprising the indication may be serialized. The indication may be comparable with other indications received at computing device 100 and/or broadcast at the multicast socket. Through a series of requests and responses from computing device 100 and mobile device 200, respectively, computing device 100 may obtain one or more display parameters of mobile device 200. Computing device 100 and/or mobile device 200 may be configured to compare display parameters that relate to a screen view of the patched application on mobile device 200 with display parameters that relate to a screen view of the application on other devices (e.g. mobile device 300).

Consistency module 250 may transmit an indication to computing device 100. Consistency module 150 of computing device 100 may compare the indication of mobile device 200 with one or more indications broadcast at the multicast socket identified by mobile device 200. In some implementations, consistency module 150 may transmit a notice to mobile device 200 detailing whether the indication of mobile device 200 matches an indication broadcast at the identified multicast socket.

In some implementations, consistency module 250 of mobile device 200 may compare the produced indication with indications from other devices that include the display analysis application and the patched application. For example, one or more other devices may broadcast one or more respective indications at the identified multicast socket at computing device 100. Consistency module 250 of mobile device 200 may obtain the broadcast indications from the one or more other devices and may compare the broadcast indications with the indications produced by mobile device 200. Consistency module 150 of computing device 100 may also store the broadcast indications from the one or more other devices in storage 120. Consistency module 150 of computing device 100 may also associate the broadcast indications with the identified multicast socket at which the indications were broadcast at storage 120. By enabling mobile devices to transmit and/or compare indications relating to display parameters, consistency module 150 of computing device 100 may track a display produced by the execution of the patched application on one or more mobile devices. In some implementations, mobile device 200 may receive data for execution of the patched application from computing device 100 in a manner similar to discussed above.

Figure 7:
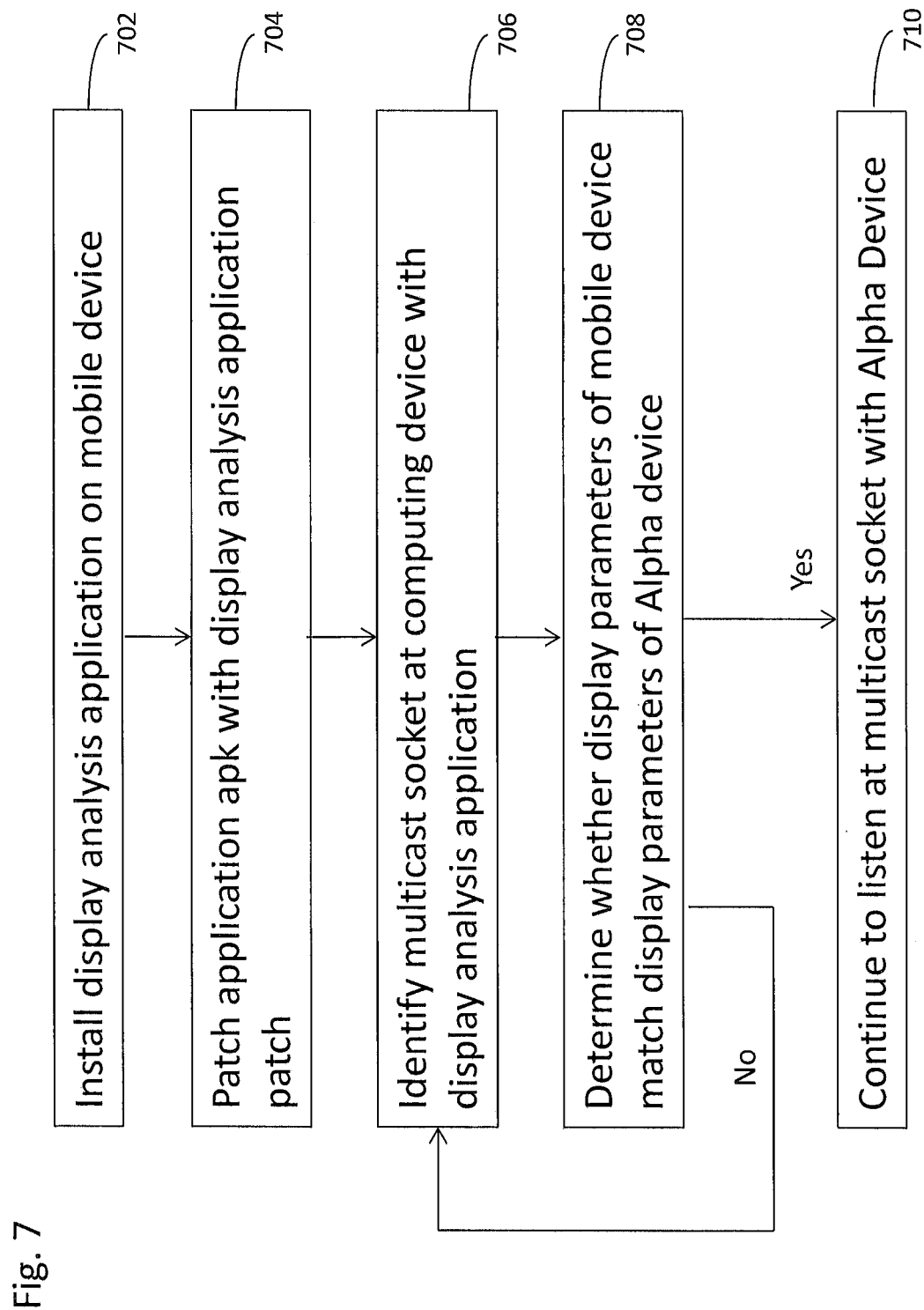
FIG. 7 illustrates a flow chart of an exemplary method of analyzing a user experience of an application on a mobile device in a system with multiple mobile devices, according to an aspect of the invention.

FIG. 7 illustrates a flowchart of an exemplary method of analyzing a user experience of an application on mobile device 200 in system 10 with multiple mobile devices. The various processing operations depicted in the flowchart of FIG. 7 are described in greater detail herein. The described operations may be accomplished using some or all of the system components described in detail above and, in some implementations, various operations may be performed in different sequences. In other implementations, additional operations may be performed along with some or all of the operations shown in FIG. 7, while some operations may be omitted. In yet other implementations, one or more operations may be performed simultaneously. Accordingly, the operations as illustrated (and described in greater detail below) are exemplary in nature and, as such, should not be viewed as limiting.

Many of the operations set forth in FIG. 7 are similar to those discussed above in relation to FIG. 4. For example, operations 702, 704, and 706 are similar to operations 402, 404, and 406, respectively, and therefore will not be described again.

In an operation 708, consistency module 250 of mobile device 200 may access one or more display parameters of one or more other mobile devices broadcast at the identified multicast socket. Mobile devices connected via the multicast socket may arbitrarily choose one mobile device as the "Alpha" device. For example, the Alpha device may be the device with the highest or the lowest serial number. In some examples, the Alpha device may be the first device to broadcast on the multicast socket. The broadcast data of the Alpha device may be marked as associated with the Alpha device. For example, an identifier may be broadcast along with data broadcast by the Alpha device on the multicast socket.

The Alpha device may broadcast its display parameters to the multicast socket. The Alpha device may also broadcast the commands invoked to obtain those display parameters. In some implementations, only the Alpha device may broadcast data to the multicast socket. Storage 120 may store an identification such as, for example, a device serial number, related to the devices which are Alpha devices on the one or more multicast sockets that computing device 100 may maintain.

Consistency module 250 may obtain the display parameters of the Alpha device similar to the methods discussed above in operations 306, 408, and 504 (e.g., by invoking the Activity.getWindow( ).getDecorView( ) command, by invoking one or more commands stored at computing device 100, by invoking one or more commands broadcast at the multicast socket, and/or other methods). Consistency module 250 may compare the display parameters relating to a screen view of the patched application after invoking one or more commands (e.g., from the multicast socket or computing device 100) with display parameters broadcast at the multicast socket.

In some implementations, consistency module 250 may compare the display parameters of mobile device 200 with display parameters broadcast at the multicast socket by the Alpha device. For example, a consistency module on the Alpha device may invoke a command on the Alpha device via Monkey. In another example, patching and testing module 130 of computing device 100 may transmit one or more commands to be invoked to the Alpha device. The Alpha device may then broadcast at the multicast socket a SHA-1 encoded serial representation of the display parameters related to a screen view of the application on the Alpha device based on the invoked command. The Alpha device and/or patching and testing module 130 of computing device 100 may also broadcast the command at the multicast socket. Patching and testing module 130 of computing device 100 may also store the invoked commands at storage 120 and associate the invoked commands with the multicast socket. Mobile device 200 (which may also be connected to the multicast socket) may invoke the same command(s) as the Alpha device. Mobile device 200 may then compare the display parameters related to a screen view of the application based on invoking the command(s) with the Alpha device's display parameters.

Mobile device 200 may access the Alpha device's SHA-1 encoded serial representation of its display parameters and may decode the representation using a shared secret (as discussed above with regard to identifying the multicast socket). Mobile device 200 may then compare a serialized representation of its display parameters with those of the Alpha device. In some implementations, mobile device 200 may transmit a serialized representation of its display parameters to consistency module 150 of computing device 100 and/or broadcast a serialized representation of its display parameters at multicast socket. In these implementations, consistency module 150 of computing device 100 may compare the display parameters of mobile device 200 with those of the Alpha device and transmit an indication to mobile device 200 as to whether its display parameters match.

In an operation 710, when the display parameters of mobile device 200 match the display parameters of the Alpha device after invoking the command, mobile device 200 may continue to listen at the multicast socket. The Alpha device may continue to broadcast the commands that it invokes and/or the resultant display parameters for the respective commands. Consistency module 250 of mobile device 200 may invoke the same commands as the Alpha device. For example, consistency module 250 of mobile device 200 may invoke the same commands as the Alpha device until its resultant display parameters no longer match those of the Alpha device, or the Alpha device has invoked all of the commands in a predetermined list.

In some implementations, the display parameters of mobile device 200 may match the display parameters of the Alpha device after the list of commands has been invoked. Mobile device 200 may be considered to be in the same pack as the Alpha device. For example, mobile device 200 may appear to have the same display functionality (e.g., same screen size, chipset, vendor, and/or other display functionality) as the Alpha device. In some implementations, computing device 100 may transmit mobile device 200 data for the execution of the patched application. In these implementations, the data may be the same data that was sent to the Alpha device regarding the execution of the patched application on the Alpha device. For example, the data may be developed by computing device 100 based on the display parameters stored in association with the Alpha device. Since mobile device 200 may be considered to be in the same pack as the Alpha device, computing device 100 may transmit the same application execution data to mobile device 200. Computing device 200 may transmit the same application execution data to every mobile device considered to be part of the same pack as the Alpha device.

When the display parameters of mobile device 200 do not match the display parameters of the Alpha device after one or more of the list of commands has been invoked (e.g., the determination of operation 708 is negative), consistency module 250 of mobile device 200 may communicate with socket module 160 of computing device 100 to obtain a new multicast address (e.g., the next multicast address available). For example, consistency module 150 of computing device 100 may transmit an indication to consistency module 250 and/or socket module 260 to listen at a different multicast socket. In some implementations, socket module 160 of computing device 100 may create another multicast socket and may communicate an SHA-1 string identifying the multicast socket to socket module 160 of mobile device 200. Alternatively, socket module 160 of computing device 100 may maintain a plurality of multicast sockets and may communicate information identifying another multicast socket to socket module 160 of mobile device 200 when pinged.

Consistency module 250 of mobile device 200 may listen for a new Alpha device at the newly identified multicast socket. Mobile device 200 may determine whether the display parameters of mobile device 200 match the display parameters broadcast on the new multicast socket in operation 708. Mobile device 200 may repeat operations 706 and 708 until mobile device 200 is part of a "pack" or mobile device 200 is the only device listening and/or broadcasting on a multicast socket.

In some implementations, consistency module 150 of computing device 100 may analyze a consistency of an execution of an application across one or more devices. For example, consistency module 150 may analyze how many packs exist. Consistency module 150 may also analyze the serialized display parameters broadcast at the multicast sockets and may determine which parameters are different among one or more packs. Consistency module 150 may further analyze a consistency of execution of one or more specific commands related to an application across one more packs. Consistency module 150 may also analyze which commands provide a disparate display parameter across one or more packs. Consistency module 150 may also perform other analyses relating to a consistency of an execution of the application across one or more packs.

A consistent execution of the patched application across similar devices may be monitored by computing device 100. For example, computing device 100 may store whether one or more devices (and/or one or more types of devices) have a consistent execution of the patched application. Computing device 100 may store the results of an execution of the patched application across multiple devices and information relating to a disparate execution of the patched application across one or more devices.

Computing device 100 may analyze the stored information related to the disparate execution of the patched application. For example, computing device 100 may analyze the stored information to determine statistics related to the execution of the application across various devices, including, for example, a number of disparate executions, a percentage of devices associated with a disparate execution of the patched application, and/or other statistics. Computing device 100 may also compare the stored information relating to a first patched application with stored information relating to a second patched application. For example, computing device 100 may compare whether the first application or the second application has a larger number of disparate executions. Other analyses may also be performed.

Aspects and implementations described herein as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other aspects or implementations, whether or not explicitly described. Thus, various changes and modifications may be made to the provided description without departing from the scope or spirit of the invention. As such, the specification and drawings should be regarded as exemplary only, and the scope of the invention to be determined solely by the appended claims.

What is claimed is:

1. A user device configured to provide information used to analyze a consistency of user experience across user devices, the user device comprising:
   one or more physical processors programmed with computer program instructions that, when executed by the one or more physical processors, cause the user device to:
      obtain a display analysis patch and incorporate the display analysis patch into an application of the user device to create a patched application configured to provide at least one display parameter, wherein the application of the user device was instantiated at the user device without the display analysis patch prior to the incorporation of the display patch;
      execute at least a portion of the display analysis patch;
      obtain, based on the executed portion of the display analysis patch, one or more display parameters associated with a screen view of the patched application, wherein the screen view relates to a user interface that is generated by the patched application; and
      cause the one or more display parameters to be transmitted to a computing device via a network.

2. The user device of claim 1, wherein the screen view of the patched application is the same as an unpatched screen view of the application such that the display analysis patch does not affect the screen view.

3. The user device of claim 1, wherein the user device is caused to:
   receive, from the computing device, a command to be executed; and
   execute the command to obtain the one or more display parameters.

4. The user device of claim 1, wherein the user device is caused to facilitate comparison of the one or more display parameters of the user device with one or more display parameters from a second user device at the computing device.

5. The user device of claim 1, wherein the user device is caused to:
obtain a second set of one or more display parameters related to a second user device;
compare the one or more display parameters with the second set of one or more display parameters; and
determine a level of consistency across the user device and the second user device based on the comparison.

6. The user device of claim 5, wherein the user device is caused to receive, from the computing device, an indication regarding whether the one or more display parameters match the second set of one or more display parameters.

7. The user device of claim 1, wherein the user device is a mobile device.

8. A computing device configured to obtain information from user devices to facilitate analysis of a consistency of user experience across the user devices, the computing device comprising:
one or more physical processors programmed with computer program instructions that, when executed by the one or more physical processors, cause the computing device to:
obtain, from a first user device, a first set of one or more display parameters associated with a first screen view of a first patched application, wherein the first patched application operates at the first user device, and wherein a first application was instantiated at the first user device without a display analysis patch prior to incorporation of the display analysis patch into the first application to create the first patched application;
obtain, from a second user device, a second set of one or more display parameters associated with a second screen view of a second patched application, wherein the second patched application operates at the second user device and wherein a second application was instantiated at the second user device without the display analysis patch prior to incorporation of the display analysis patch into the second application to create the second patched application;
compare the first set of one or more display parameters with the second set of one or more display parameters; and
determine, based on the comparison, whether or not the first user device and the second user device provide the same level of user experience.

9. The computing device of claim 8, wherein the computing device is caused to determine that the first user device and the second user device do not provide the same level of user experience responsive to a determination that the first set of one or more display parameters are not the same as the second set of one or more display parameters.

10. The computing device of claim 8, wherein the computing device is caused to:
transmit a command to the first user device and the second user device, wherein the first set of one or more display parameters from the first user device and the second set of one or more display parameters from the second user device are each based on the command.

11. The computing device of claim 10, wherein the command is to be executed by one or more of the first user device to obtain the first set of one or more display parameters or the second user device to obtain the second set of one or more display parameters.

12. The computing device of claim 8, wherein the computing device is caused to transmit an indication of a result of the comparison to at least the first user device.

13. The computing device of claim 8, wherein the first user device is a first mobile device, and the second user device is a second mobile device.

14. A method of analyzing consistency of user experience of a patched application on a user device, the method being implemented on a user device comprising one or more physical processors programmed with one or more computer program instructions that, when executed by the one or more physical processors, perform the method, the method comprising:
obtaining a display analysis patch and incorporate the display analysis patch into an application of the user device to create a patched application configured to provide at least one display parameter, wherein the application of the user device was instantiated at the user device without the display analysis patch prior to the incorporation of the display patch;
executing at least a portion of the display analysis patch;
obtaining, based on the executed portion of the display analysis patch, one or more display parameters associated with a screen view of the patched application, wherein the screen view relates to a user interface that is generated by the patched application; and
causing the one or more display parameters to be transmitted to a computing device via a network.

15. The method of claim 14, wherein the screen view of the patched application is the same as an unpatched screen view of the application such that the display analysis patch does not affect the screen view.

16. The method of claim 14, further comprising:
receiving, from the computing device, a command to be executed; and
executing the command to obtain the one or more display parameters.

17. The method of claim 14, further comprising facilitating comparison of the one or more display parameters of the user device with one or more display parameters from a second user device at the computing device.

18. The method of claim 14, further comprising:
obtaining a second set of one or more display parameters related to a second user device;
comparing the one or more display parameters with the second set of one or more display parameters; and
determining a level of consistency across the user device and the second user device based on the comparison.

19. The method of claim 18, further comprising receiving, from the computing device, an indication regarding whether the one or more display parameters match the second set of one or more display parameters.

20. The method of claim 14, wherein the user device is a mobile device.

* * * * *